(12) United States Patent
Pegg et al.

(10) Patent No.: US 9,274,568 B2
(45) Date of Patent: Mar. 1, 2016

(54) MOBILE ELECTRONIC DEVICE AND METHODS OF MANUFACTURE THEREOF

(71) Applicant: BlackBerry Limited, Waterloo (CA)

(72) Inventors: Albert Murray Pegg, Breslau (CA); Li Huang, Kitchener (CA); Enliang Wang, Kitchener (CA); Timothy Kyowski, Kitchener (CA); Steven Prsa, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 184 days.

(21) Appl. No.: 13/962,605

(22) Filed: Aug. 8, 2013

(65) Prior Publication Data

US 2015/0043141 A1 Feb. 12, 2015

(51) Int. Cl.
*G06F 1/16* (2006.01)
*G06F 1/18* (2006.01)
*H04M 1/02* (2006.01)
*H05K 5/00* (2006.01)

(52) U.S. Cl.
CPC .............. *G06F 1/182* (2013.01); *G06F 1/1637* (2013.01); *H04M 1/026* (2013.01); *H04M 1/0249* (2013.01); *H04M 1/0277* (2013.01); *H05K 5/0017* (2013.01)

(58) Field of Classification Search
CPC ... G06F 1/1626; G06F 1/1656; H04M 1/0249
See application file for complete search history.

(56) References Cited

U.S. PATENT DOCUMENTS

| | | | | |
|---|---|---|---|---|
| 5,394,306 A | * | 2/1995 | Koenck et al. | 361/809 |
| 5,613,237 A | * | 3/1997 | Bent et al. | 455/351 |
| 6,028,765 A | * | 2/2000 | Swindler et al. | 361/679.55 |
| 6,532,152 B1 | * | 3/2003 | White et al. | 361/692 |
| 6,560,092 B2 | * | 5/2003 | Itou et al. | 361/679.55 |
| 6,781,825 B2 | * | 8/2004 | Shih et al. | 361/679.58 |
| 6,894,739 B2 | * | 5/2005 | Sung et al. | 349/58 |
| 6,983,130 B2 | * | 1/2006 | Chien et al. | 455/90.3 |
| 7,697,269 B2 | * | 4/2010 | Yang et al. | 361/679.01 |
| 8,254,098 B2 | * | 8/2012 | Liu et al. | 361/679.02 |
| 8,531,834 B2 | * | 9/2013 | Rayner | 361/679.56 |
| 2002/0112870 A1 | * | 8/2002 | Kobayashi et al. | 174/50 |
| 2005/0286214 A1 | * | 12/2005 | Chen | 361/681 |
| 2006/0279924 A1 | * | 12/2006 | Richardson et al. | 361/683 |
| 2008/0066956 A1 | * | 3/2008 | Lawlyes et al. | 174/535 |
| 2009/0067141 A1 | | 3/2009 | Dabov et al. | |
| 2009/0296325 A1 | | 12/2009 | Morimoto et al. | |
| 2010/0061040 A1 | * | 3/2010 | Dabov et al. | 361/679.01 |
| 2010/0061044 A1 | * | 3/2010 | Zou et al. | 361/679.01 |
| 2011/0050054 A1 | * | 3/2011 | Chang et al. | 312/223.1 |
| 2011/0255218 A1 | * | 10/2011 | Pakula et al. | 361/679.01 |
| 2012/0039057 A1 | * | 2/2012 | Paleczny et al. | 361/807 |
| 2012/0062428 A1 | | 3/2012 | Imano et al. | |
| 2012/0147573 A1 | | 6/2012 | Lim et al. | |
| 2013/0016486 A1 | | 1/2013 | Allore et al. | |
| 2013/0170159 A1 | * | 7/2013 | Jiang | 361/753 |

OTHER PUBLICATIONS

Extended European Search Report; Application No. 14179770.4; Oct. 2, 2014; 6 pages.

* cited by examiner

*Primary Examiner* — Adrian S Wilson
(74) *Attorney, Agent, or Firm* — Conley Rose, P.C.; J. Robert Brown, Jr.

(57) ABSTRACT

Disclosed herein is a mobile device comprising a plate; the plate being adapted to accommodate a printed circuit board; a ring bonded to the plate; a seal disposed between the ring and the plate, the plate and ring and seal forming a mid-plate structure; wherein the seal comprises a platform; and a housing unit bonded to the platform.

11 Claims, 11 Drawing Sheets

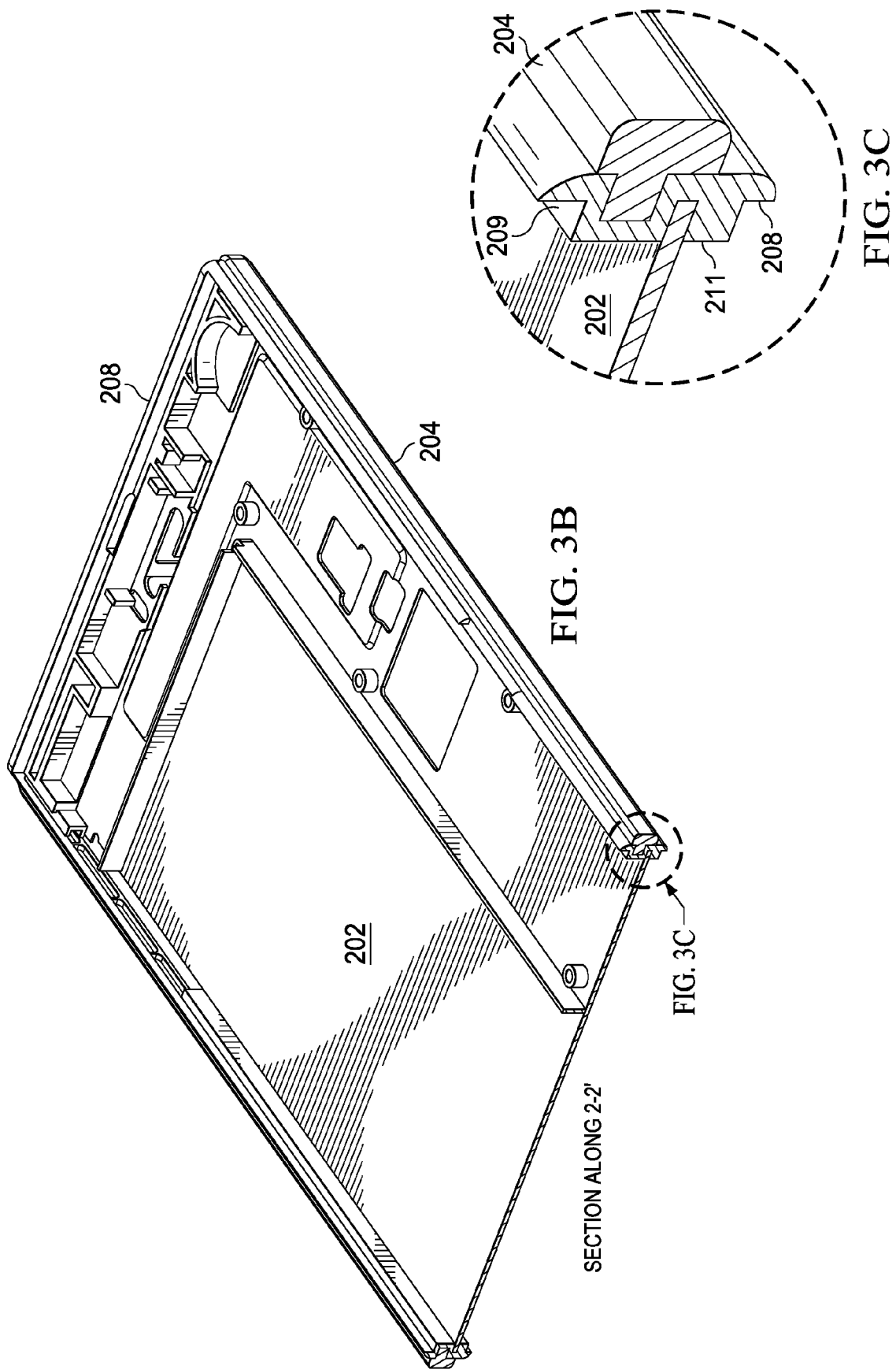

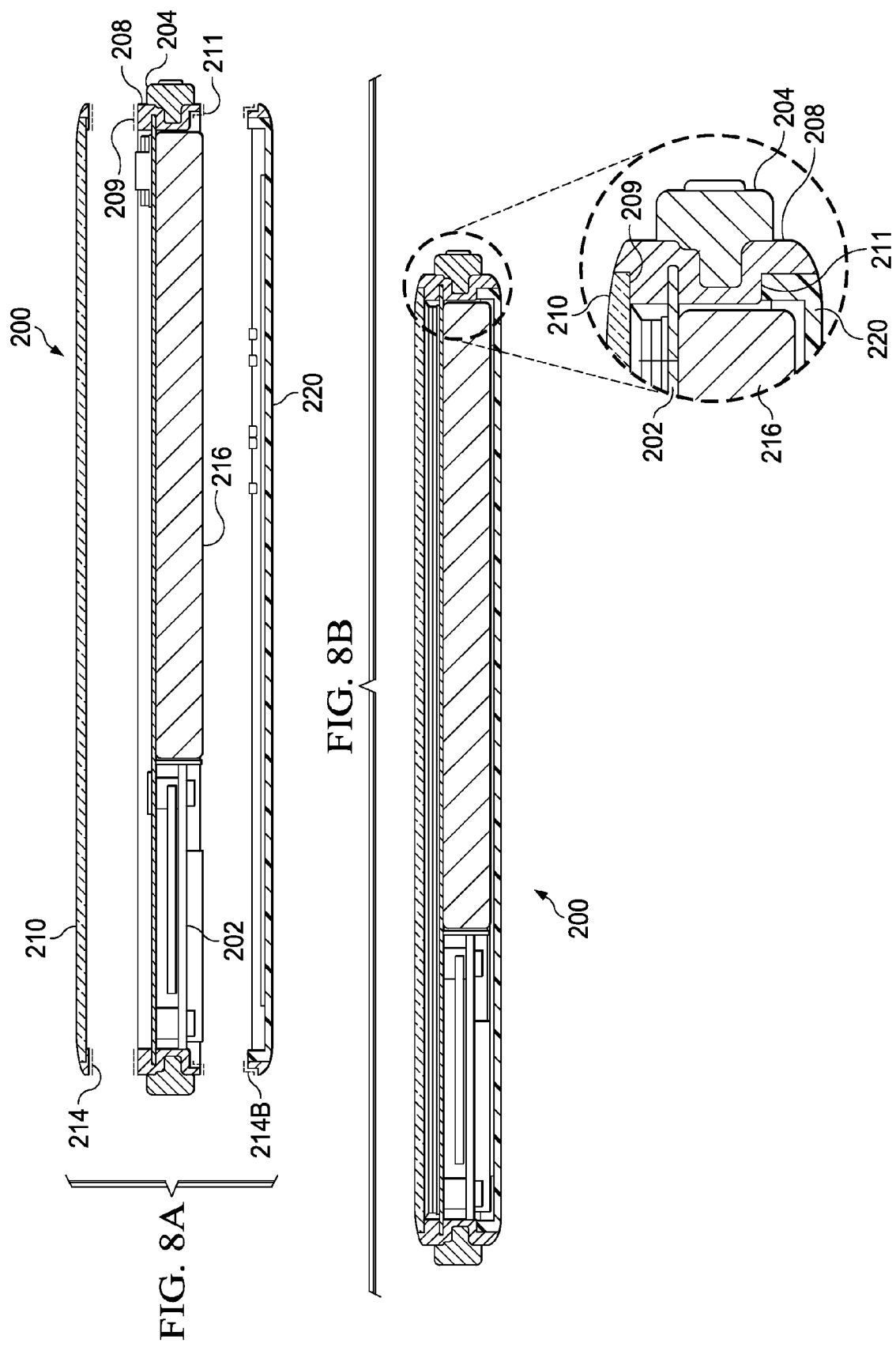

MOBILE ELECTRONIC DEVICE AND METHODS OF MANUFACTURE THEREOF

BACKGROUND

This disclosure relates to a mobile electronic device and to methods of manufacture thereof.

Mobile electronic devices (or portable electronic devices) are electronic devices that are readily movable from place to place. Considerations of size and weight are important to mobile electronic devices in general, and may be especially important to handheld electronic devices in particular (electronic devices sized to be held or carried in a human hand, and typically used while held or carried). Examples of mobile electronic devices include a smart phone, a tablet computer, a handheld computer, a mobile internet device, a wearable computer, a personal digital assistant, a handheld gaming console, a personal navigation device, a smart watch, a head mounted display, a calculator, a remote control, a portable media player, or the like. Many mobile electronic devices may be capable of communicating wirelessly with other devices or with wireless communication systems.

With the advent of more robust wireless communications systems, compatible handheld communication devices are becoming more prevalent, as well as more advanced. In the past, such handheld communication devices accommodated either voice transmission (cell phones) or text transmission (pagers and PDAs). Today's consumer often demands a combination device capable of performing both types of transmissions, including even sending and receiving e-mail. Furthermore, these higher-performance devices can also be capable of sending and receiving other types of data including that which allows the viewing and use of internet websites.

SUMMARY

Disclosed herein is a mobile device comprising a plate; the plate being adapted to accommodate a printed circuit board; a ring bonded to the plate; a seal disposed between the ring and the plate, the plate and ring and seal forming a mid-plate structure; wherein the seal comprises a platform; and a housing unit bonded to the platform.

BRIEF DESCRIPTION OF THE FIGURES

FIG. 3(B) is a cross-section taken at section 2-2' of the mobile device after the molding process;

FIG. 3(C) is a blown-up diagram depicting the molded polymeric resin and its relationship with the ring and the plate;

FIG. 8(A) depicts the before and after of the assembly to the mid-plate structure of the mobile device 200; and FIG. 8(B) shows the location of the display unit, the battery, and the rear housing unit with respect to the seal 208.

DETAILED DESCRIPTION

Figure 1:
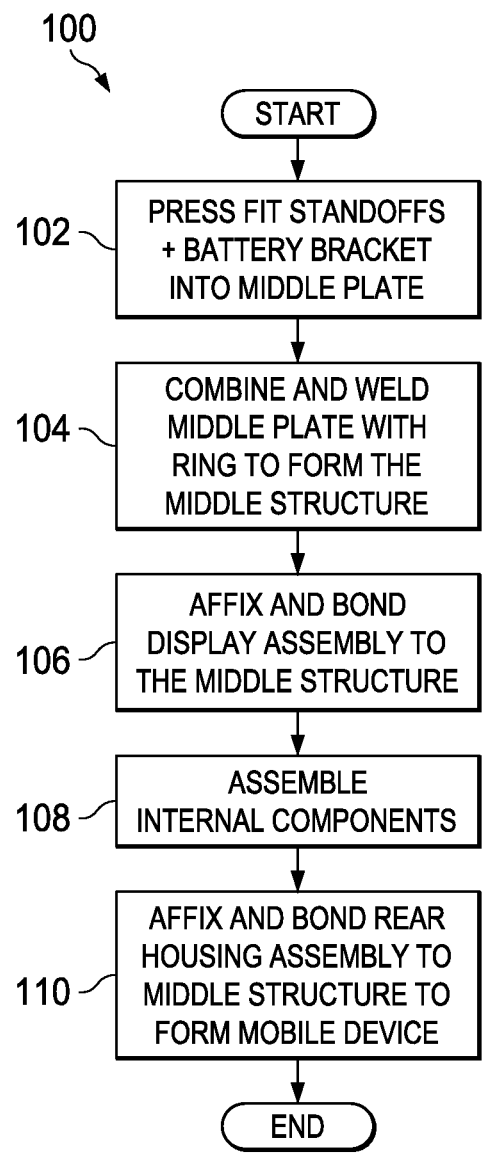
FIG. 1 is a process diagram that depicts a method or manufacturing the mobile device.

Mobile electronic devices can be affected by considerations that may be in opposition to one another. On the one hand, the desire for more functionality may drive the device to be bigger, thicker, and heavier; but on the other hand, concerns with portability and handheld convenience may drive the device to be smaller, thinner, and lighter. Disclosed herein are products and techniques by which a mobile electronic device can be practically constructed. The mobile electronic devices may be constructed to be thin, for example, without necessarily loss of functionality. Further, the construction is substantially robust.

Many mobile electronic devices generally have either unibody construction or mid-plate construction. In unibody construction, the body is generally manufactured from a single piece of metal or polymer. The components of the mobile electronic device such as, for example, the mobile communication module, the wireless internet module, or the like, are disposed within the body. In short, in this type of mobile electronic device, the display, keypad, and any navigation tools are attached to a common body member (i.e., the body that is derived from a single piece of metal or polymer). The strength of the device lies not only in the structural frame but rather in the strength of the whole device.

Mobile devices may also be manufactured using a mid-plate construction. The mid-plate may extend across substantially all of the mobile device's interior or may occupy only a portion of the interior. The mid-plate generally lies in a major plane of the mobile device.

The mid-plate generally provides a surface on which internal components of the mobile device may be anchored. The mid-plate, in turn, is affixed to the housing of the mobile device, thereby imparting structural stability and/or rigidity to both the affixed components and the phone itself. The retaining structure may be affixed to the mid-plate at or near an edge of the battery and generally between the battery and a protected internal component.

Disclosed herein is a mobile electronic device that comprises a unified structure, comprising both unibody construction as well as mid-plate construction. The components that are used in construction can be welded or adhesively bonded together. In an exemplary embodiment, the various components can be welded together. The welding can include laser welding, spot welding, ultrasonic welding, and the like. The mobile device thus manufactured is stronger and more robust than other comparative mobile devices that use either a unified structure or unibody construction. It can also be assembled more economically and disassembled with reduced destruction thus enabling lower cost manufacturing and recycling of its components.

As will be described in detail, the structure includes a plate and a ring, which are bonded together. The plate and the ring can be formed separately and often better (e.g., in terms of tolerances, dimensions, physical features, mass production quality and the like) than a structure made from a single piece of metal. The resulting "skeleton" of ring bonded to plate can be partially or completely coated with a polymer seal, thereby forming a plate-ring-seal assembly (that may be called a "mid-plate structure," and that is not to be confused with a mid-plate construction described earlier). This mid-plate structure can enable a mobile electronic device that is comparatively thin yet can robustly support, anchor and protect various electronic and non-electronic components. The mid-plate structure may accommodate, for example, a front or rear housing, a display assembly, a printed circuit board, a speaker, an antenna and other electronic or non-electronic components.

Figure 2A:
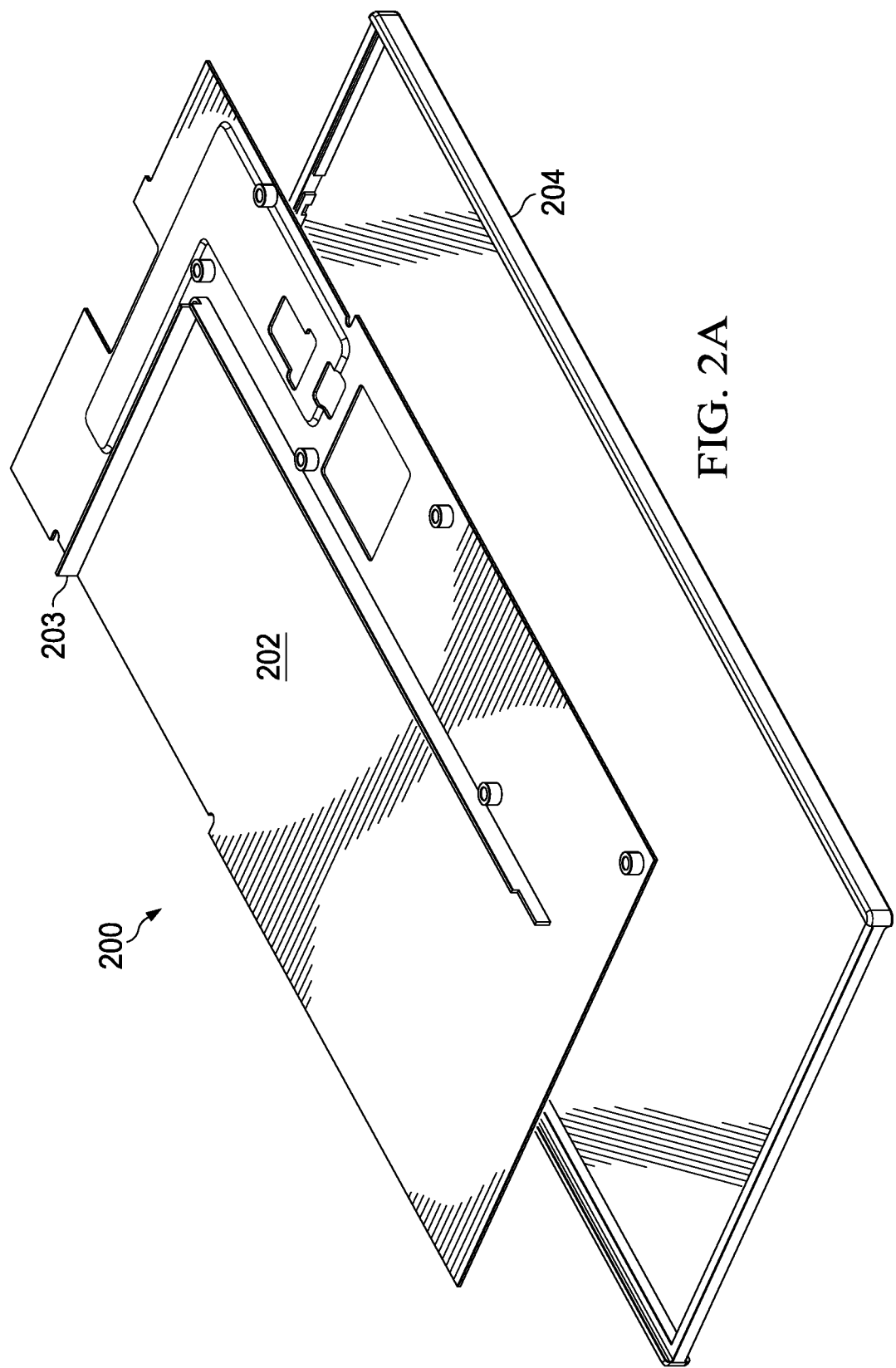
FIG. 2(A) depicts the plate and the ring apart from each other.
Figure 2B:
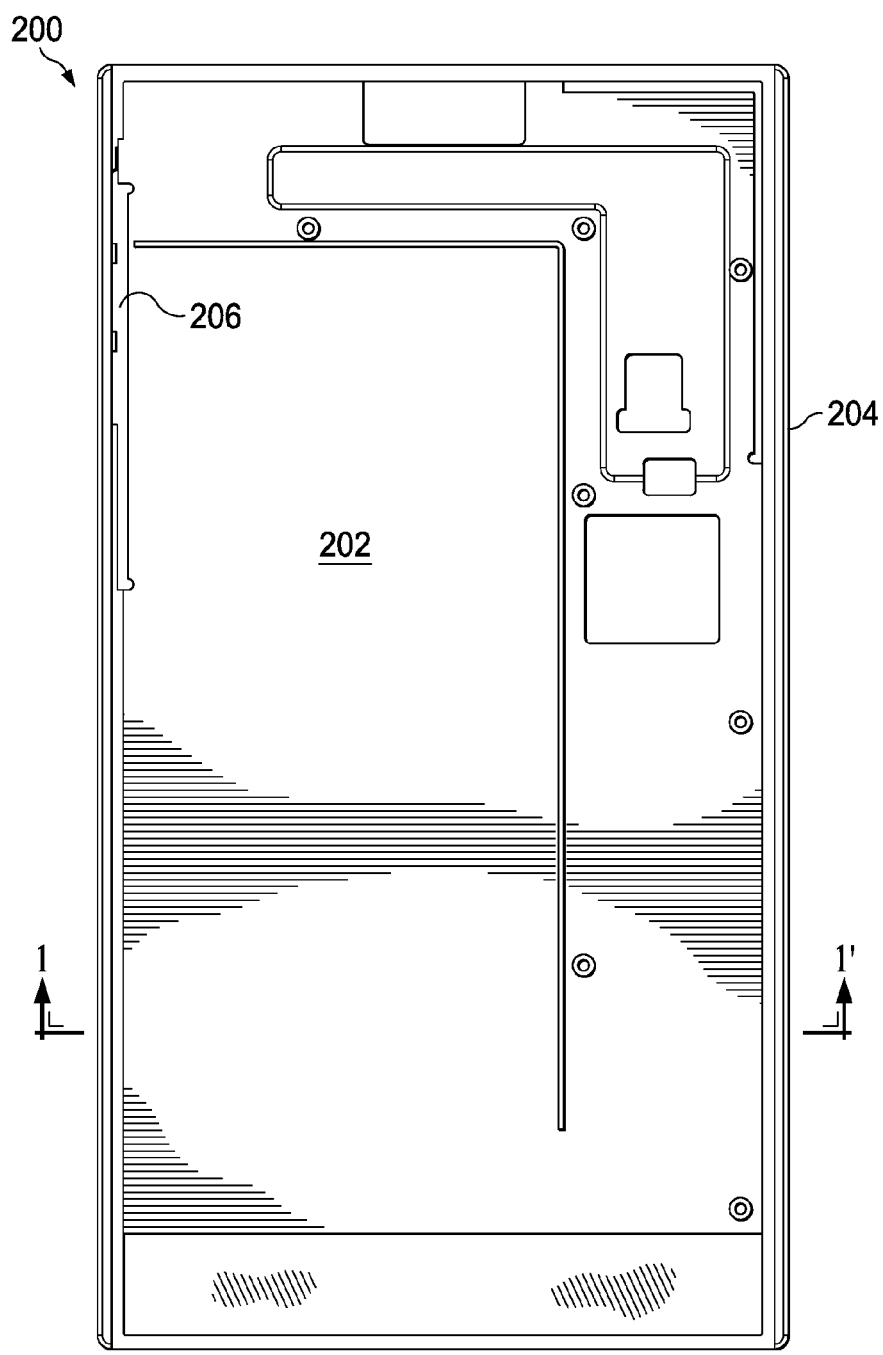
FIG. 2(B) depicts the plate after it is bonded to the ring to form the middle-plate.
Figure 2C:
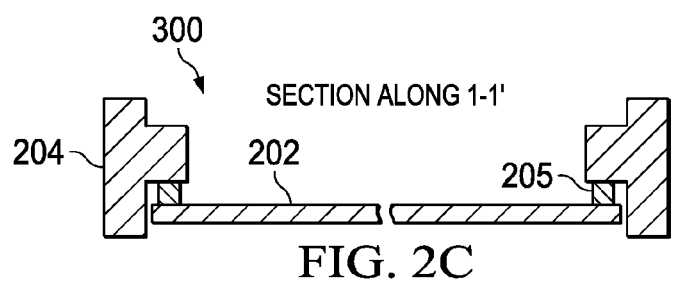
FIG. 2(C) is a depiction of a cross-section of the ring and the plate taken at section 1-1' of the FIG. 2(B)

The FIG. 1 is a process diagram that depicts an exemplary method 100 for manufacturing the mobile device 200. Some of the steps depicted in the method 100 are also illustrated by the FIGS. 2-8 and these figures will be referenced in connection with the steps detailed in the FIG. 1. With reference now to the step 102 in the FIG. 1 and additionally with reference to the FIGS. 2(A) and 2(B), a middle plate (also denoted as a plate in the FIG. 2) is first constructed by press fitting a plate 202, typically with one or more physical features such as standoffs (not shown) and a battery bracket 203. The plate 202 is depicted as rectangular, that is, substantially but not necessarily strictly rectangular, with two long sides and two short sides (or ends). In other words, the plate 202 shown in the FIGS. 2(A) and 2(B) is not strictly rectangular, because (for example) some physical features may keep the long and short sides from being strictly straight, and the periphery of the plate 202 may be irregular, but the overall shape of the plate 202 resembles a rectangle. The plate 202 optionally may include or define one or more physical features. The illustrated features of the plate 202, such a brackets (e.g., battery bracket 203), cut-outs, holes, slots, notches, indentations, protrusions and the like, are not necessary in all embodiments, or may vary from embodiment to embodiment. The plate 202 may be planar (that is, strictly or substantially planar). The FIG. 2(A) depicts the plate 202 and the ring 204 apart from each other, while the FIG. 2(B) depicts the plate 202 after it is welded (or more generally, bonded) to the ring 204 to form the middle-plate. The ring 204 is generally planar, in that the interior surface or edges of the ring 204 generally follow the same plane as the periphery of the plate 202. Colloquially speaking, when the plate 202 is bonded to the ring 204, the ring 204 surrounds and covers all or part of the periphery of the plate 202. The overall shape or contour of the ring 204 is rectangular, that is, resembling a rectangle but not necessarily being strictly rectangular. For example, the ring 204 may have irregular edges/surfaces or rounded corners along its inner or outer periphery. Notably, as shown in the FIG. 2(B), the dimensions of the rectangle of the ring 204 need not be similar to the dimensions of the plate 202. In the FIG. 2(B), the long sides of the rectangle of the ring 204 are noticeably longer than the long sides of the plate 202; the short sides of the rectangle of the ring 204 are about the same size as the short sides of the plate 202. The FIG. 2(C) depicts the section 1-1' (not necessarily to scale) of the FIG. 2(B).

One technique for creating the ring 204 is to cut the ring from a metal (such as steel) using Electrical Discharge Machining (EDM), which supports precise cutting and which can mass-produce rings with less risk of warping (that is, with improved likelihood that the rings will be planar). Another technique for creating the ring 204 may be to use cold-rolling. A strip or wire of steel, for example, may be shaped using one or more rollers, and bent into a ring. A cold-rolled ring may be subjected to further machining (such as computer numerical control (CNC) machining) to create some physical features, such as forming an aperture. Like EDM, cold-rolling may support efficient mass production. It is to be noted that while at this stage the assembly does not function as a mobile device, the partly assembled structure in the FIGS. 2-7 are referred to by the numeral 200, which represents the mobile device. This is done for ease of understanding and for simplicity.

The standoffs are not explicitly shown in the FIGS. 2(A) and 2(B) but may be used to support and hold in place modules and systems that are used in mobile devices. These modules may include a wireless communication unit, a broadcast receiving module, a camera, a microphone, and the like. Some of these modules and systems will be described in detail later. The plate 202 may have one or more cut-outs, such as cut-outs 206, along its periphery. When the plate 202 is bonded to the ring 204, the space between the periphery of the plate 202 and the ring 204 due to the cut-outs 206 may generate features such as slots or openings or other voids. Such voids may have any number of functions, such as to accommodate various modules and components and systems included in the mobile device 200, or to produce electromagnetic effects, or to affect the structural integrity or flexibility of the "skeleton." The plate 202 with the standoffs and the battery bracket 203 is then welded to a ring 204.

The plate 202 and the ring 204 may be made from a material or set of materials that can serve as a "skeleton" for a mobile electronic device. In addition to offering structural integrity, rigidity and durability, the "skeleton" can support, anchor and protect the electronic components of the mobile electronic device. In a typical embodiment, the plate 202 and ring 204 include or are made of a metal. Examples of suitable metals are copper, iron, aluminum, tin, zinc, gold, silver, tantalum, lead, manganese, nickel, chromium, molybdenum, titanium, vanadium, niobium, or the like, or a combination comprising at least one of the foregoing metals, or alloys thereof.

In some embodiments, a polymer (such as an organic polymer, plastic, or silicone) may be used with or in place of a metal, and in other embodiments other kinds of materials may be used. The plate 202 and the ring 204 can comprise the same metal or polymer. In another embodiment, the plate 202 and the ring 204 can comprise different metals or polymers or a variety of combinations of metals or polymers. For purposes of simplicity, it will be assumed that the plate 202 and the ring 204 are made of steel (such as stainless steel). Steel may offer, among other potential advantages, structural stability and durability in exchange for its density, various thermal qualities, convenience of manufacture and good quality control using EDM, and ease of bonding by welding. An exemplary steel for use in the plate 202 and the ring 204 is SS 304 or SS 316.

With reference now once again to the FIG. 1 and the FIGS. 2(B) and 2(C), the plate 202 is welded to the ring 204 along portions of the ring 204 as detailed in step 104 (of the FIG. 1). In an embodiment, the plate 202 is not welded to the entire ring along the entire inner perimeter of the ring 204. Bonding in selected sites is done for a variety of purposes. Some purposes include leaving one or more spaces or slots or other voids to accommodate various components. Further, bonding at selected sites may be all that is called for as a practical matter, since other materials and manufacturing processes described below will help further secure the plate 202 and the ring 204 to one another.

In an embodiment, the welding is conducted by laser beam welding. Laser beam welding (LBW) is a welding technique used to join multiple pieces of metal through the use of a laser. The beam provides a concentrated heat source, allowing for narrow, deep welds and high welding rates. Laser beam welding has high power density (on the order of 1 MW/cm²) resulting in small heat-affected zones and high heating and cooling rates. The spot size of the laser can vary between 0.2 mm and 13 mm, though only smaller sizes are used for welding. The depth of penetration is proportional to the amount of power supplied, but is also dependent on the location of the focal point: penetration may be generally maximized when the focal point is slightly below the surface of the work-piece. A continuous or pulsed laser beam may be used depending upon the application. Millisecond-long laser beam pulses may be used to effect the welding of the plate 202 to the ring 204. The use of laser beam welding may be used to produce small spot welds between the plate 202 and the ring 204 so as to preserves space for the attachment of the antennae and for accessibility to various connectors and keys. In a typical bonding, six spot welds (three on each of the long sides and none on the short ends of the plate 202) secure the plate 202 to the ring 204. These sites of bonding may be called attachment sites. In a typical implementation, the plate 202 and the ring 204 need not be in physical contact or connection at sites other than the attachment sites.

FIG. 2(C) is a depiction of a cross-section of the ring 204 and the plate 202 taken at section 1-1' of the FIG. 2(B). From FIG. 2(C), it may be seen that a laser weld 205 is used to affix the plate 202 to the ring 204. While the ring 204 has a cross-section in the shape of the letter "T" in the FIG. 2(C), the cross-sectional area may have any desired shape, i.e., it may be square, rectangular, triangular, polygonal, circular, or combinations thereof. In an embodiment, the laser welding may be used to produce a plurality of spot welds that promote the affixation of the ring 204 to the plate 202.

With the plate 202 bonded to the ring 204 to form a "skeleton," the "skeleton may then be covered, in whole or in part, with a plastic or polymer. The polymer may be applied in any fashion, such as by molding, spraying or dipping. With reference now to the FIG. 1 and the FIG. 3, the ring 204 with the plate 202 welded thereto now also have bonded to them a polymer seal 208 (hereinafter seal 208). The seal 208 may serve a number of functions. First, the seal 208 may contribute to the bonding of the ring 204 and the plate 202 to strengthen the welded structure and improve the integrity of the "skeleton" as well as the entire plate-ring-seal assembly or mid-plate structure 300. Second, the polymer seal 208 may add structural integrity or stability without adding a significant amount of weight and without taking up a significant amount of space. Third, the polymer seal 208 may be essentially inert with respect to electromagnetic effects, and may have a negligible effect upon electrical components in the mobile electronic device. In other words, the seal 208 may be manufactured from a material that is transparent to the radio frequency regime of the electromagnetic radiation spectrum, and this transparency may (for example) prevent interference with signal transmissivity or reception. Fourth, the seal 208 may have properties of a seal, such as the capability to resist moisture or contaminants. Fifth, the seal 208 may itself include or define brackets, cut-outs, holes, ridges or other structures that can accommodate or support other components. Sixth, the seal may serve as a frame for secure attachment for various components, as will be illustrated below.

In a typical assembly process, the ring 204 with the plate 202 welded thereto is placed in a mold and a molten polymeric resin is disposed in the slots between the plate 202 and the ring 204 to form the seal 208. The polymer used in the seal 208 can be any of several thermoplastic polymers, thermosetting polymers, or blends thereof, for example. The polymer may be reinforced with fillers to form a polymeric composite. The polymer may have any of several properties, including elastic or elastomeric properties, adhesive properties, durability, thermal properties, and so on.

Figure 3A:
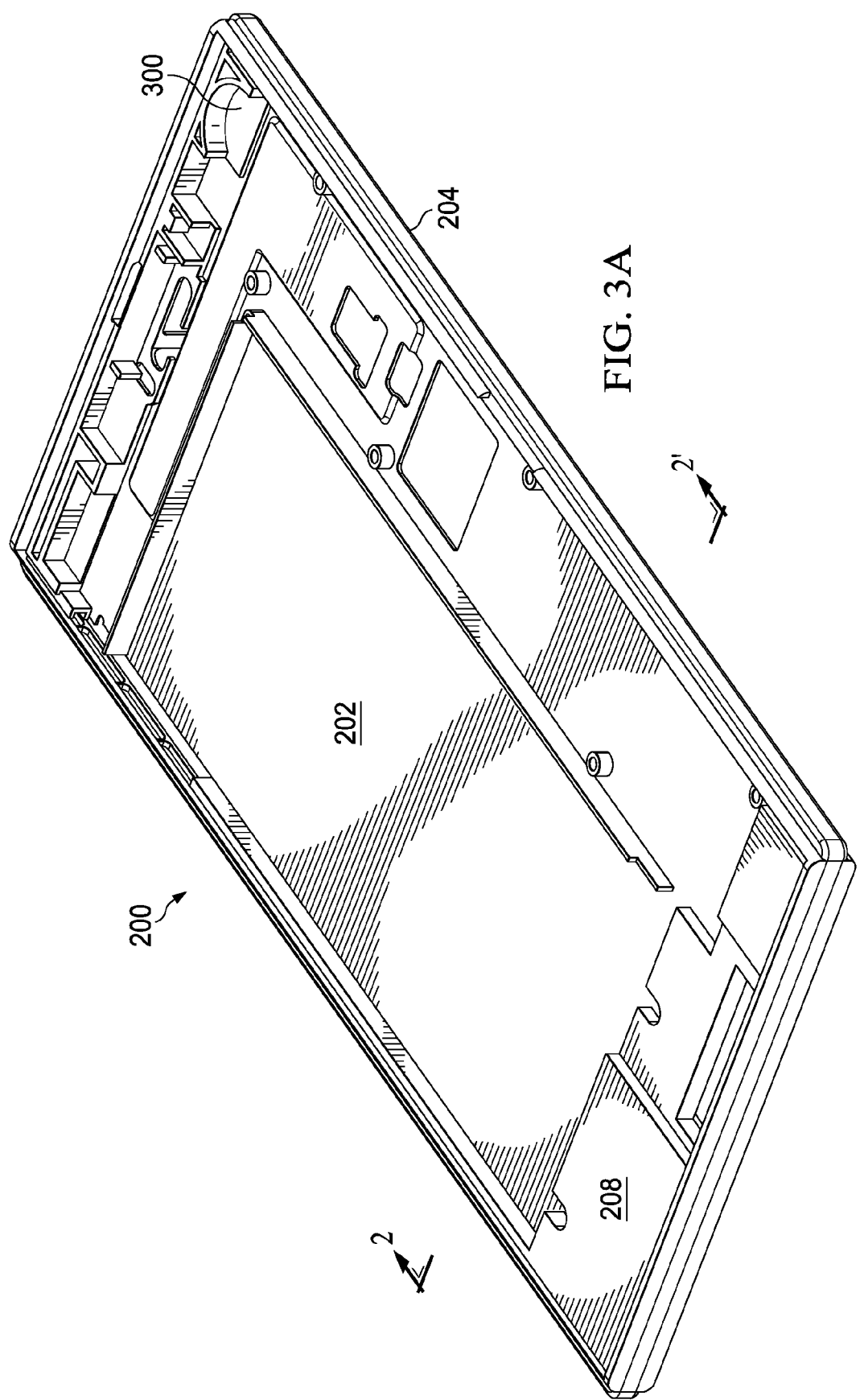
FIG. 3(A) depicts the molded polymeric resin that is disposed between the ring and the plate.
Figure 4:
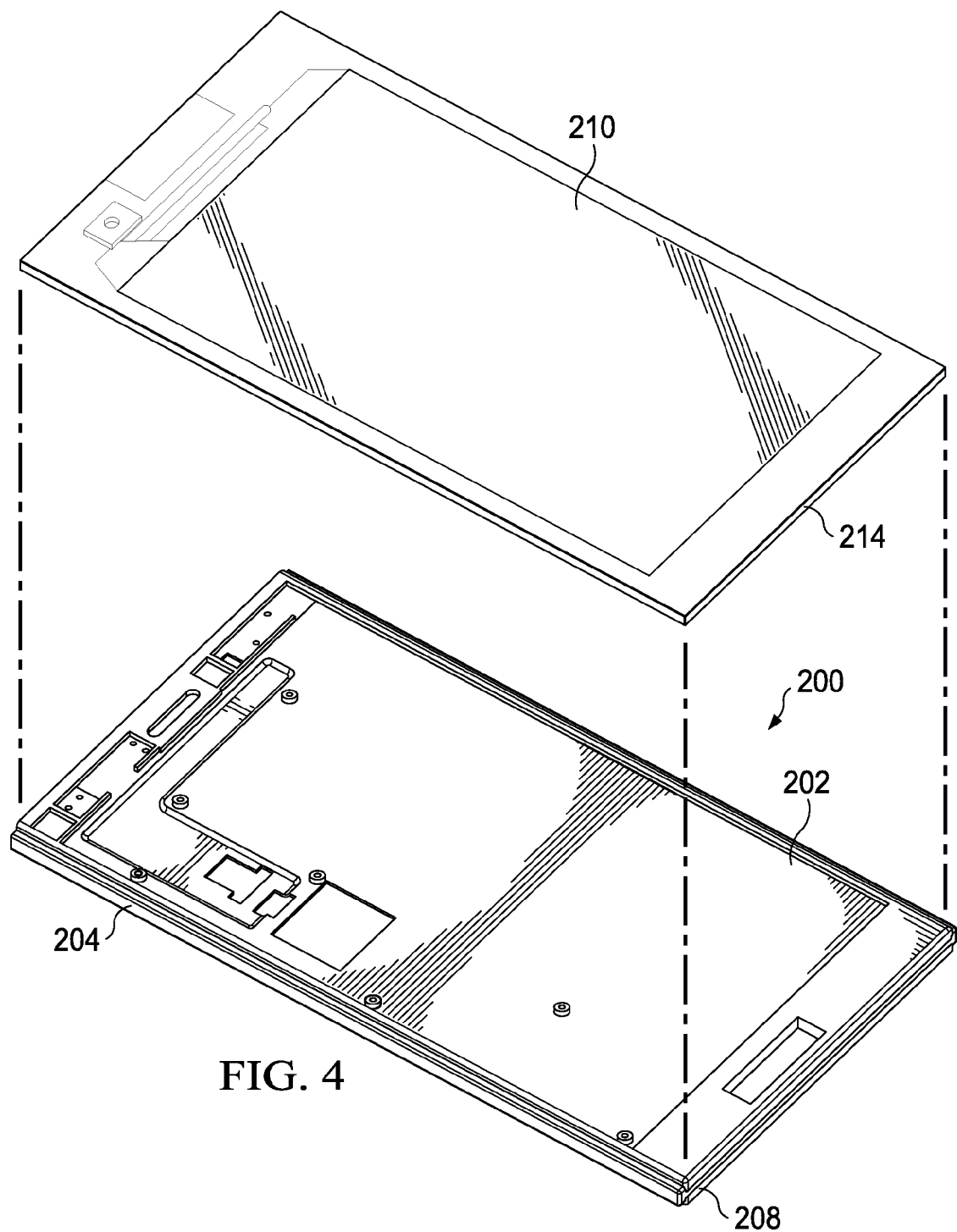
FIG. 4 depicts how the display unit 210 is assembled into the mobile device.

The molding of the seal 208 may be conducted by injection molding or compression molding, for example. After the injection molding, the polymeric resin may be subjected to finishing processes to remove any unwanted mold lines, sprues, bushings, or the like. FIG. 3(A) depicts the seal 208 that is disposed between the ring 204 and the plate 202. The seal 208 may be disposed between the ring 204 and the plate 202 even if the seal 208 is not disposed between the ring 204 and the plate 202 at every site on the ring 204 or the plate 202. In other words, even though the plate 202 and the ring 204 are attached to one another at some attachment sites (with no part of the seal 208 interposed at those sites), at other sites the plate 202 and the ring 204 are not in physical contact and the seal 208 is interposed between the plate 202 and the ring 204. Put yet another way, the plate 202 and the ring 204 may be physically joined or in contact at some attachment sites and elsewhere may be physically separated or spaced apart. The seal 208 may be interposed at those sites where the plate 202 and the ring 204 are spaced apart. In a typical implementation, the seal 208 may be interposed between the plate 202 and the ring 204, except at the attachment sites. FIG. 3(B) is a depiction of a cross-section taken at 2-2' of the FIG. 3(A). From the FIG. 3(B) it may be seen that the seal 208 fills in the space between the ring 204 and the plate 202 and accommodates the shape of the ring 204 and the plate 202. The seal 208 is molded in such a manner to provide a first platform 209 upon which is disposed the rear housing assembly and a second platform 211 upon which is disposed the display assembly. The first platform 209 and the second platform are on opposite sides of the plate 202 and are substantially parallel to the planar surface of the plate 202. The display assembly and the rear housing assembly will be detailed later.

After molding, further machining may be done on the plate 202, the ring 204 or the seal 208. For example, as shown in the FIG. 3(A), a cut-out (i.e., a slot) may be taken from the ring 204 after the molding. The cut-out may be created by milling, for example. Some after-molding machining or other processing may be desirable because the plate 202, the ring 204 and the seal 208 are securely bonded to one another, and the assembly may behave as a single object. After-molding machining may be performed, for example, to create one or more structures to accommodate or support other components.

Following the construction of this plate-ring-seal assembly, one or more components may be joined or attached to the assembly. For example, a display unit, a battery, a wireless communication unit (typically comprising a mobile communication module, a wireless internet module, a short range communication module, a location information module, or the like), an audio-visual input unit (typically comprising a camera and a microphone), a sensing unit (typically comprising a proximity sensor), one or more processors and memory components are attached to the assembly. In many cases, the components are attached to the plate 202, but some may be attached to or supported by the ring 204 or the seal 208. The display unit is generally disposed on or proximate to one face of the plate 202, while the wireless communication unit, the audio-visual input unit, the sensing unit and the memory are disposed on or proximate to the opposing face of the plate 202. While these devices (i.e., the display unit, the wireless communication unit, the audio-visual unit, the sensing unit, the memory, or the like) are listed as being part of the mobile device 200, it possible to exclude some of these devices (i.e., they are optional) or to add additional devices not listed here.

For purposes of illustration, attaching a display unit will be described. As seen in the FIG. 4, the display unit 210 may be attached to the plate-ring-seal assembly (i.e. the mid-plate structure 300). The display unit 210 may display (output) information, such as text, still pictures, moving pictures or graphics. The display unit may include at least one of a liquid crystal display (LCD), a thin film transistor-LCD (TFT-LCD), an organic light emitting diode (OLED) display, a flexible display, or a three-dimensional (3D) display. Some of those displays may be configured with a transparent or optical transparent lens to allow viewing of the exterior through the display unit. The display unit 210 may include a touch sensitive sensor (referred to as a touch sensor) and have an interlayer structure. This structure may be referred to as a touch screen. With a touch screen, the display unit may also be used as an input device rather than just an output device. The touch sensor may be implemented as a touch film, a touch sheet, a touch pad, or the like. The touch sensor may also be configured to convert changes of pressure applied to a specific part of the display unit, or a capacitance occurring from a specific part of the display unit into electric input signals. The touch sensor may therefore be configured to sense not only a touched position and a touched area, but also a touch pressure. (Generally speaking, when an element or component is described as "configured to" perform one or more functions, that element or component is suitable for performing the function, or is adapted to perform the function, or is operable to perform the function, or is physically arranged to perform the function or is otherwise capable of performing the function.) The display unit may also be used in conjunction with an audio output module, an alarm unit and a haptic module.

The display unit 210 may include a frame or housing constructed from a combination of several materials, and the display unit 210 may be attached to the mid-plate structure 300 by physically connecting the frame or a portion thereof to the mid-plate structure 300. As shown in the FIGS. 4, 7 and 8(A), the display unit may include one or more structures, such as a polymer rim 214. The polymer rim 214 may be bonded to the mid-plate structure 300 by using a technique that fuses the components together (e.g., that fuses the polymer in the polymer rim 214 with the polymer in the seal 208), such as laser welding. When the seal 208 comprises a polymer having cross-linkages, laser welding a polymeric component to the seal 208 may create a very strong attachment at the molecular level, with the polymer of the attached component and the polymer of the seal 208 forming cross-linkages. In effect, the attached polymer and the seal may fuse to behave as a single piece. In some circumstances, attachment of a component to the mid-plate structure 300 may be improved, strengthened, reinforced or otherwise enhanced with attachment techniques in addition to fusion, such as the use of an adhesive. With reference now to the FIGS. 3 and 4, the molded polymer rim 214 of the display unit 210 contacts the seal 208 at the second platform 211. A layer of pressure sensitive adhesive (PSA) may be applied to the molded polymer rim 214 to bond it to the second platform 211. This is shown in greater detail in the FIGS. 7 and 8, which will be discussed in detail later. Laser welding may be used to bond or fuse the molded polymer rim 214 to the second platform 211. The adhesive and the fusing operate in concert to result in a very secure attachment. In some cases, fusing may be used without any other attachment technique, and in some cases, fusing may be combined with one or more other attachment techniques as well, such as a clip, a snap, an adhesive, and so on. A potential advantage of fusing, such as fusing by laser welding, is that fusing can be used by itself and can be readily combined with other attachment techniques. Components other than the display unit 210 may include one or more structures that similarly may be bonded to the mid-plate structure 300, thereby attaching the component to the mid-plate structure 300.

As detailed above, the wireless communication unit, the audio-visual input unit, the sensing unit and the memory are disposed on the opposing side of the plate 202 in the mobile device 200 from the side that has the display unit. The wireless communication unit typically includes one or more elements allowing radio communication between the mobile device 200 and a wireless communication system, or allowing radio communication between the mobile device 200 and a network in which the mobile device 200 is located. For example, the wireless communication unit may include a broadcast receiving module, a mobile communication module, a wireless internet module, a short-range communication module, a location information module, or the like.

The broadcast receiving module receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits it to the mobile device 200. The broadcast signal may include a TV broadcast signal or a radio broadcast signal.

The broadcast associated information may mean information regarding a broadcast channel, a broadcast program, a broadcast service provider, or the like. The broadcast associated information may also be provided through a mobile communication network, and in this case, the broadcast associated information may be received by the mobile communication module.

The broadcast associated information may exist in various forms. For example, it may exist in the form of an electronic program guide (EPG) of digital multimedia broadcasting (DMB), electronic service guide (ESG) of digital video broadcast-handheld (DVB-H), or the like.

The broadcast receiving module may receive a broadcast signal using various types of broadcast systems. In particular, the broadcast receiving module may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), or the like. The broadcast receiving module is, of course, configured to be suitable for every broadcast system that provides a broadcast signal as well as the above-mentioned digital broadcast systems. The broadcast signal and/or broadcast-associated information received through the broadcast receiving module may be stored in the memory.

The mobile communication module transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module means a module for supporting wireless internet access. The wireless internet module may be built-in or externally installed to the mobile device 200. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), or the like.

The short-range communication module is a module for supporting a short-range communication. Here, it may be used a short-range communication technology including Bluetooth®, Radio Frequency IDentification (RFID), Infrared Data Association (IrDA), Ultra WideBand (UWB), ZigBee®, or the like.

The location information module is a module for checking or acquiring a location of the mobile device 200, and there is a Global Positioning System (GPS) module as a representative example.

The AN (audio/video) input unit receives an audio or video signal, and the NV input unit may include a camera and a microphone. The camera processes an image frame, such as a still picture or a video, obtained by an image sensor in a video phone call or image capturing mode. The processed image frame may be displayed on the display unit.

The image frames processed by the camera may be stored in the memory or transmitted to an external device through the wireless communication unit. One or more cameras may be provided per mobile device 200. In an embodiment, two or more cameras may be provided per mobile device 200.

The microphone receives an external audio signal in either a phone call mode, a recording mode, a voice recognition mode, or the like, and processes the audio signal into electrical voice data. The processed voice data may be converted and outputted into a format that is transmittable to a mobile communication base station through the mobile communication module in the phone call mode. The microphone may implement various types of noise canceling algorithms to cancel noise generated in a procedure of receiving the external audio signal.

The user input unit may generate input data to control an operation of the mobile device 200. The user input unit may be configured by including a keypad, a dome switch, a touch pad (pressure/capacitance), a jog wheel, a jog switch, or the like.

The sensing unit detects a current status of the mobile device 200 such as an opened or closed state of the mobile device 200, a location of the mobile device 200, an orientation of the mobile device 200, or the like, and generates a sensing signal for controlling the operation of the mobile device 200. For example, when the mobile device 200 is a slide phone type, it may sense an opened or closed state of the slide phone. Furthermore, the sensing unit takes charge of a sensing function associated with whether or not power is supplied from the power supply unit, or whether or not an external device is coupled to the interface unit. The sensing unit may include a proximity sensor.

Figure 5A:
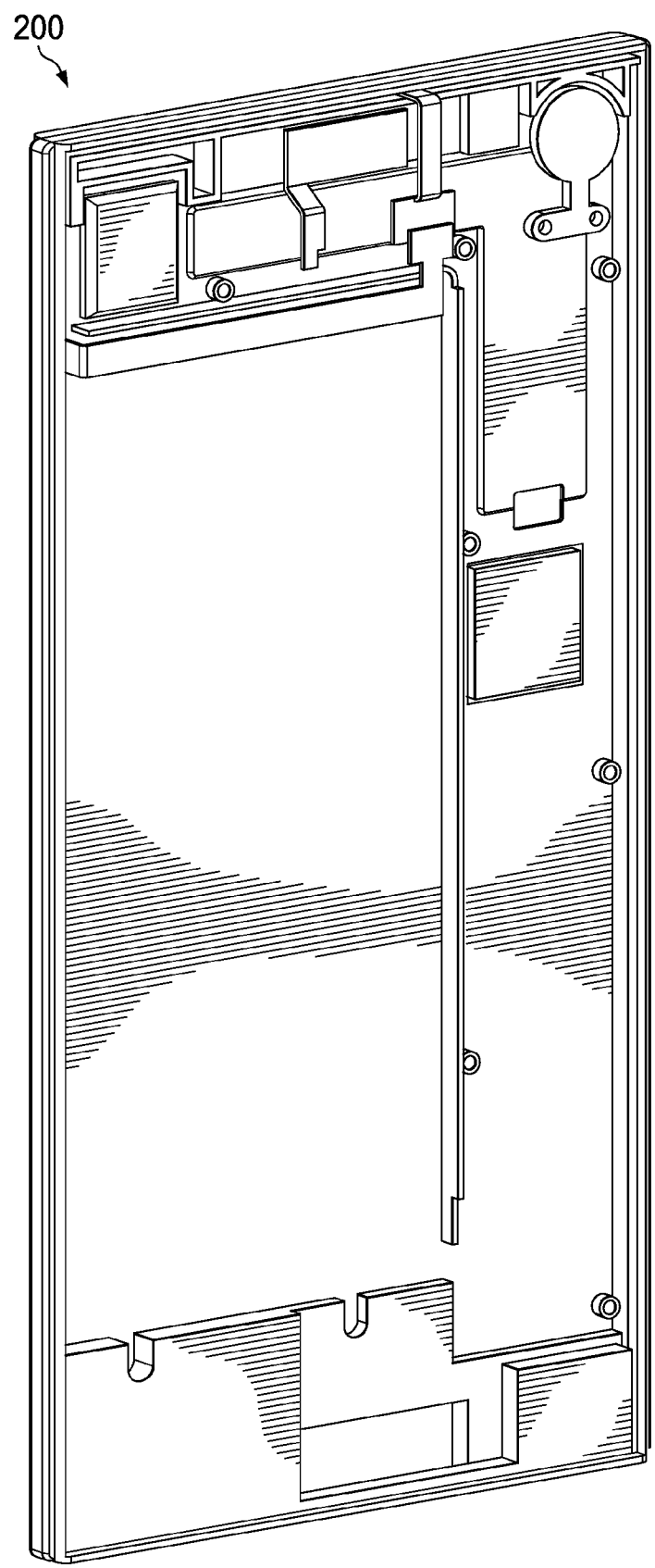
FIG. 5(A) is a side view depicting the assembly of components into the mobile device.
Figure 5B:
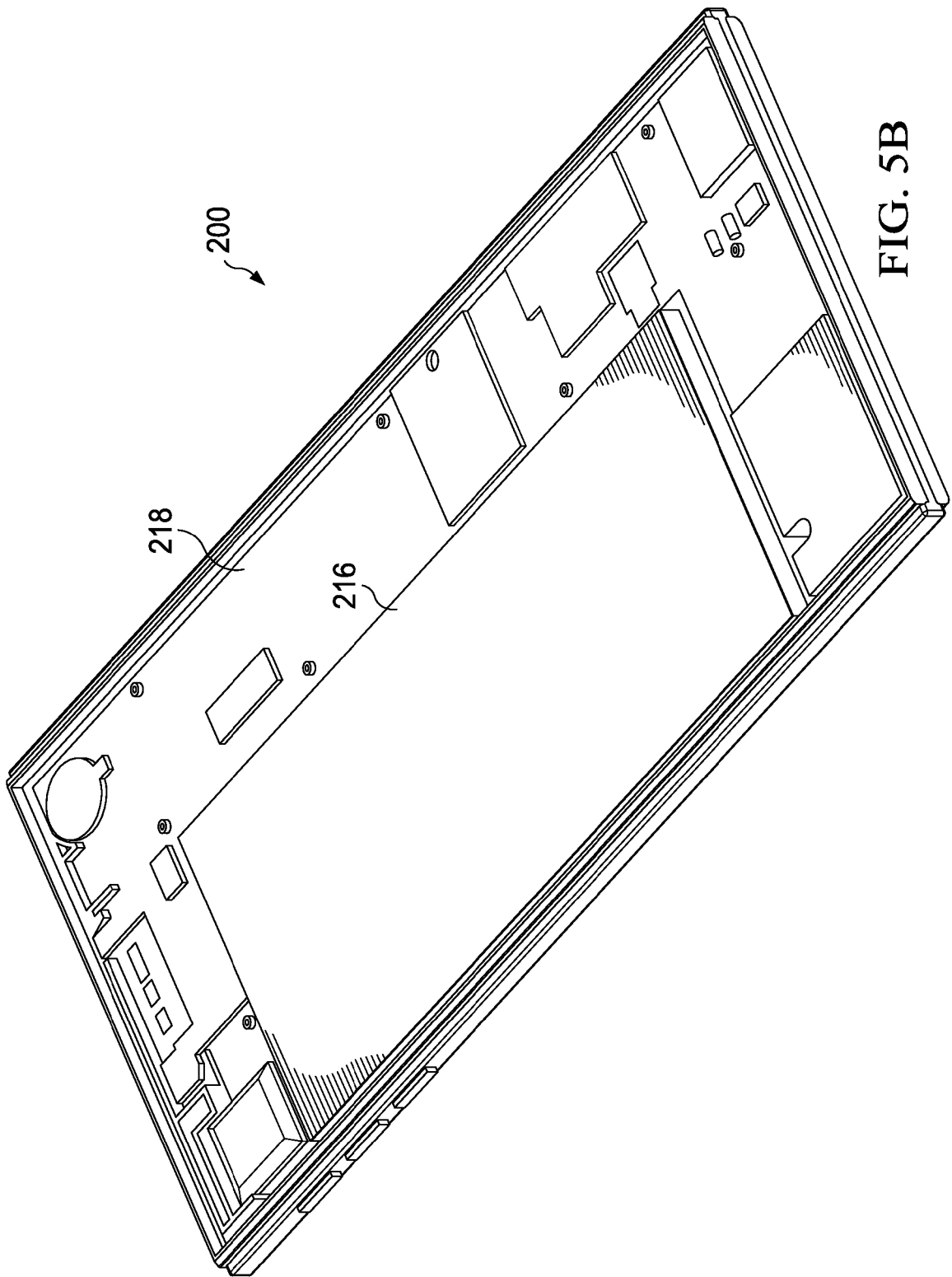
FIG. 5(B) is a isometric view depicting the assembly of the battery and printed circuit board in to one side of the mid-plate structure.

The wireless communication unit, the audio-visual input unit, sensing unit, and the memory may be disposed on a printed circuit board, or may alternatively, have some of their respective components disposed on a printed circuit board. FIG. 5 depicts the wireless communication unit, the audio-visual input unit, the sensing unit, the battery, and the memory being disposed in the mobile device 200 on the side of the mid-plate structure 300 that is opposed to the side that contains the display unit. In the FIGS. 5(A) and 5(B), a battery 216 and a printed circuit board 218 (on which the communication unit, the audio-visual unit, the sensing unit and/or the memory are disposed) are placed into the mobile device 200 on the side that is opposed to the side that contains the display unit. FIG. 5(A) is a side view depicting the assembly of components into the mobile device. FIG. 5(B) is a isometric view depicting the assembly of the battery and printed circuit board in to one side of the mid-plate structure 300. The mid-plate structure 300 accommodates the printed circuit board, in that the printed circuit board may be attached or physically connected, directly or by one or more intermediate components, to the mid-plate structure 300 (typically the plate 202). The plate 202 is adapted to or configured to accommodate the printed circuit board.

Figure 6:
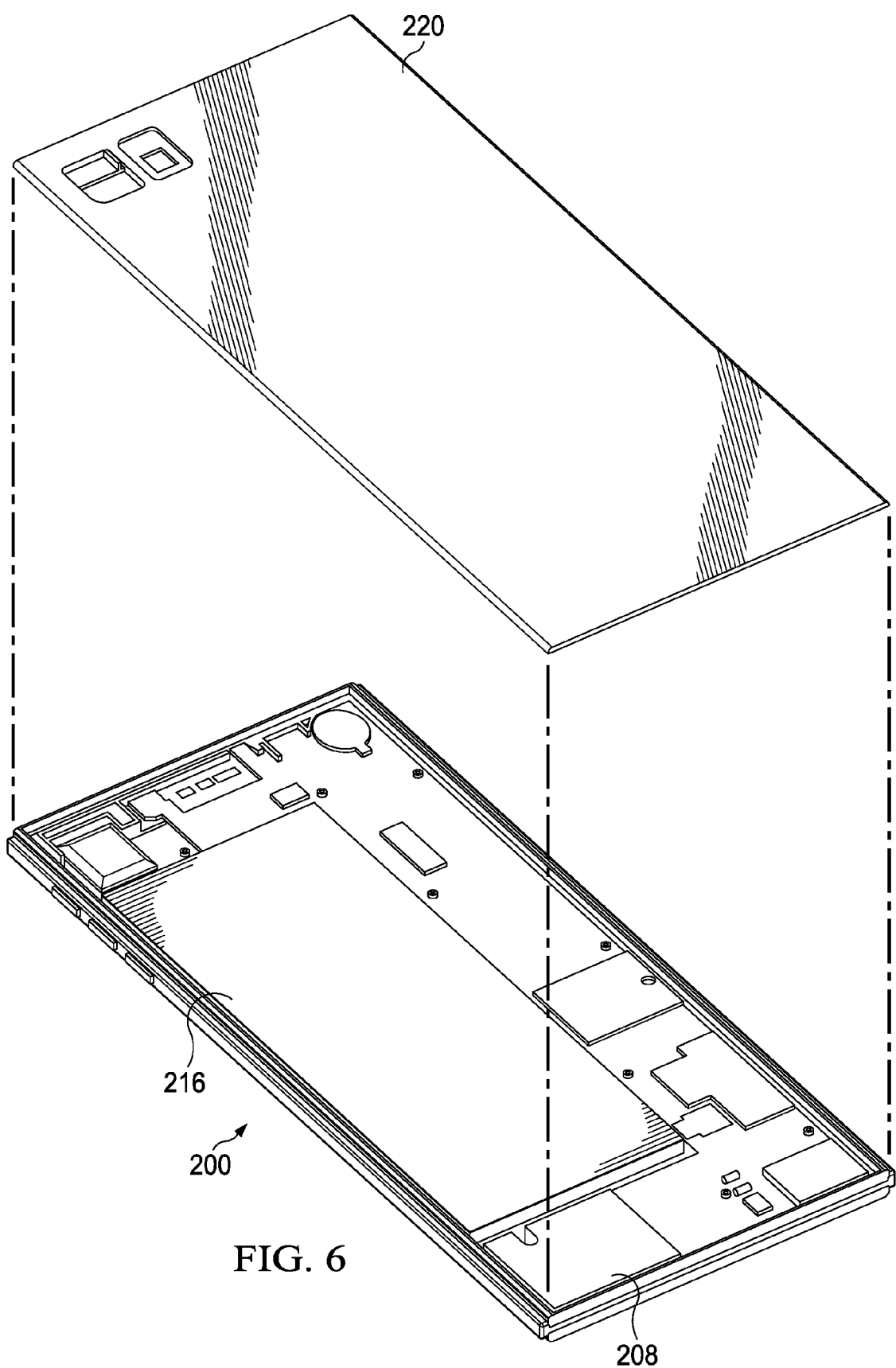
FIG. 6 is an isometric view showing the assembly of the rear housing unit and the mid-plate structure to form the mobile device 200.
Figure 7:
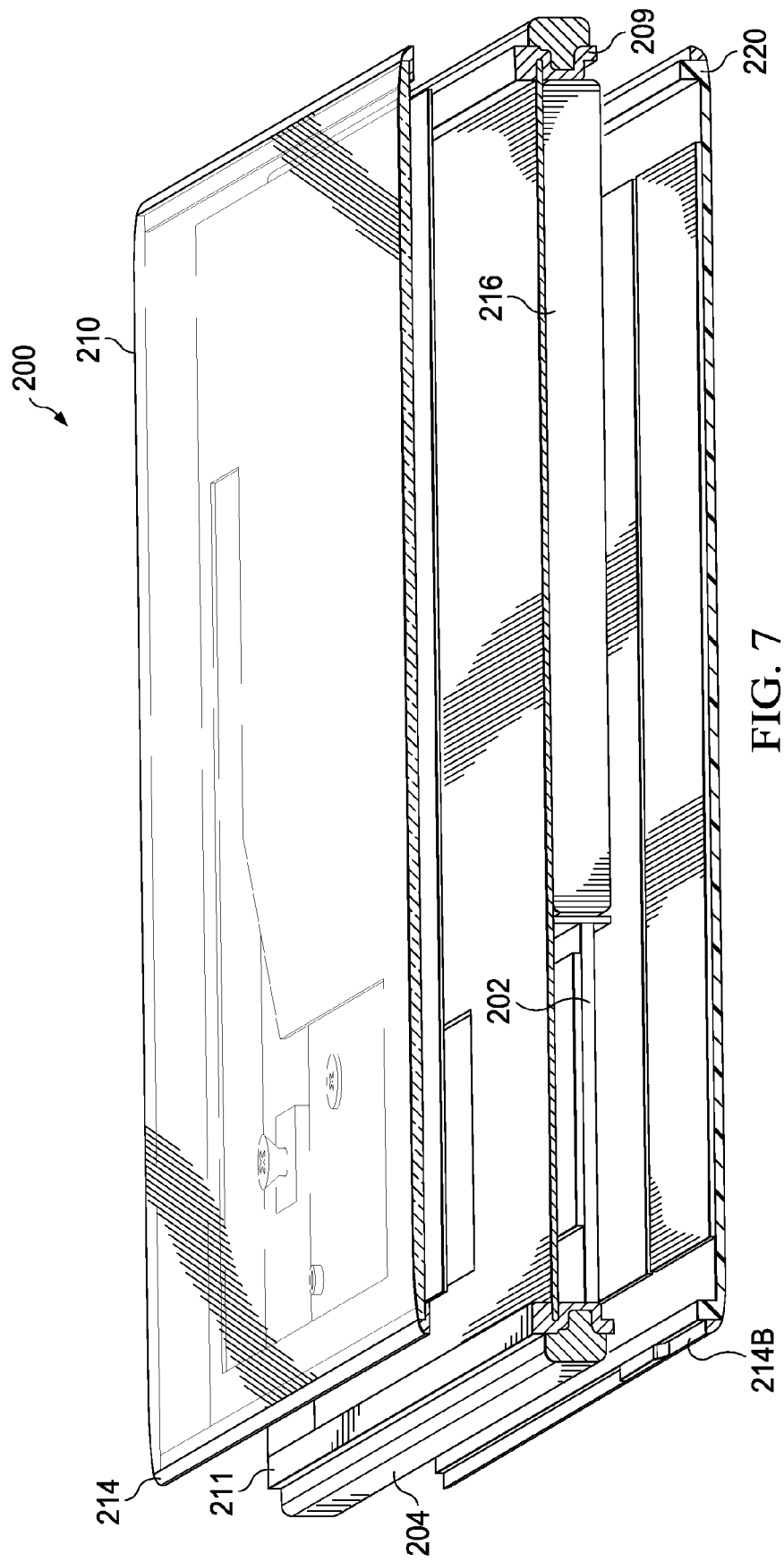
FIG. 7 is an isometric view of the assembly of the display unit and the rear housing unit into the mid-plate structure to form the mobile device 200.

With reference now to the FIGS. 6, 7 and 8, a rear housing 220 is then disposed to cover and protect the circuitry and the battery (or other power element) of the mobile device 200. The rear housing 220 may serve other functions as well, such as to give structural integrity to the mobile device 200, to give a user a convenient place to touch or hold the mobile device 200, or to give the mobile device 200 desirable aesthetic qualities. In some embodiments, the mobile device 200 may include a front housing (not shown), that is, a housing disposed on the side of the mobile device 200 with which a user would typically interact in ordinary use. FIG. 6 is an isometric view showing the assembly of the rear housing unit and the mid-plate structure 300 to form the mobile device 200. FIG. 7 is an isometric view of the assembly of the display unit and the rear housing unit into the mid-plate structure 300 to form the mobile device 200. FIG. 8(A) depicts the before and after of the assembly to the mid-plate structure 300 of the mobile device 200. FIG. 8(B) shows the location of the display unit, the battery, and the rear housing unit with respect to the seal 208. The rear housing 220 may be constructed from a single material or from a combination of materials. For purposes of illustration, the rear housing 220 may comprise a combination of polymeric materials and fiber glass. The fiber glass provides strength, light weight, thin structure and favorable economics to the mobile device 200. The rear housing 220 may optionally be provided with a molded polymer rim 214B, and the rear housing 220 may be bonded to the mid-plate structure 300, as shown in the FIG. 6, by bonding the polymer rim 214B to the seal 208 of the mid-plate structure 300, as described above. Bonding may be accomplished by laser welding. In some cases, a PSA may also be employed to help secure the rear housing 220 to the mid-plate structure 300. As depicted in the FIG. 7, the molded polymer rim 214B of the rear housing 220 may contact the seal 208 at the first platform 209. Optionally, a layer of pressure sensitive adhesive may be applied to the molded polymer rim 214B to bond it to the first platform 209. This is shown in greater detail in the FIGS. 7 and 8. Thereafter, laser welding may be used to bond (or to fuse) the molded polymer rim 214B to the first platform 209.

FIG. 7 is an isometric view depicting the various parts of the mobile device 200 prior to assembly. FIG. 8(A) is a side view depicting the mobile device 200 before and after assembly, while FIG. 8(B) depicts the contact between the first platform 209, the second platform 211 that are a part of the seal 208 and the optional molded polymer rims 214 and 214B that are affixed to the display unit 210 and to the rear housing 220.

It is to be noted that the assembly of the display unit 210 and the internal components of the mobile device 200 (e.g., the wireless communication unit, the audio-visual input unit, the sensing unit, the memory, or the like) may be accomplished sequentially or simultaneously. For example, the components of the mobile device may be assembled prior to the assembly of the display unit 210, during the assembly, or after the assembly. In another embodiment, the assembly of the rear housing 220 may be conducted simultaneously or sequentially with the assembly of the display unit 210.

Colloquially speaking, the mid-plate structure 300 is the physical framework for the mobile device 200. The mid-plate structure gives the mobile device 200 structural integrity, offers impact resistance, and serves as a framework for secure attachment the various electronic components, among other functions. When constructed as a plate-ring-seal assembly, a mobile electronic device having the mid-plate structure can be lighter or thinner than comparably sized or featured mobile electronic devices having unibody construction or mid-plate construction.

In summary, in one method of manufacturing the mobile device, a plate is bonded to a ring, such as by welding. The plate is adapted to accommodate (e.g., support, anchor, protect) components such as a printed circuit board and a battery. Although the plate may be generally rectangular, a periphery of the plate may have cut-outs or other physical features.

A seal is disposed between the ring and the plate to form a mid-plate structure. The seal may be molded on. The seal comprises a first platform and a second platform, where the respective platforms are located on opposing sides of the plate, where the first platform and the second platform face mutually opposed directions.

One or more of a mobile communication module, a wireless internet module, a short range communication module, a location information module, an audio-visual input unit comprising a camera and/or a microphone; a sensing unit comprising a proximity sensor; and a memory may be disposed on the mid-plate structure. A display unit and a rear housing unit are bonded to the mid-plate structure. The bonding may comprise fusing by laser welding, and in some cases additional forms of bonding, such as adhesive bonding, may also be employed.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mobile device comprising:
    a plate; the plate being adapted to accommodate a printed circuit board;
    a ring bonded to the plate via a plurality of attachment points, wherein the attachment points partially define a plurality of void-spaces between the ring and the plate;
    a seal disposed within the void-spaces, the plate and ring and seal forming a mid-plate structure; wherein the seal comprises a platform; and
    a housing unit bonded to the platform.

2. The mobile device of claim 1, wherein the ring and the plate include steel, and wherein the ring is bonded to the plate with a weld.

3. The mobile device of claim 1, wherein the plate is rectangular having two long sides, and wherein the ring is rectangular having two long sides, and wherein one of the long sides of the ring is bonded to one of the long sides of the plate.

4. The mobile device of claim 1, wherein the platform is a first platform, the seal further comprising a second platform, wherein the first platform and the second platform face mutually opposed directions; the mobile device further comprising a display unit bonded to the second platform.

5. The mobile device of claim 1, wherein the seal comprises a polymer and wherein the housing unit comprises a polymeric rim, and wherein the polymeric rim of the housing unit is bonded to the platform of the seal with laser welding.

6. The mobile device of claim 1, where the seal comprises an elastomer.

7. The mobile device of claim 4, where the bond between the housing unit and the first platform and the bond between the display unit and the second platform are adhesive bonds.

8. The mobile device of claim 1, where the bond between the housing unit and the platform is accomplished with laser welding.

9. The mobile device of claim 1, where the housing unit comprises a metal or a polymer.

10. The mobile device of claim 1, where the mobile device is a smart phone, a tablet, a handheld computer, a mobile internet device, a wearable computer, a personal digital assistant, a handheld gaming console, a personal navigation device, a smart watch, a head mounted display, a calculator or a portable media player.

11. The mobile device of claim 1, further comprising one or more of a mobile communication module, a wireless internet module, a short range communication module, a location information module, an audio-visual input unit comprising a camera and/or a microphone; a sensing unit comprising a proximity sensor; and a memory.

* * * * *